(12) United States Patent
Ramakrishnan et al.

(10) Patent No.: US 12,227,117 B2
(45) Date of Patent: Feb. 18, 2025

(54) RECONFIGURABLE STORAGE BIN FOR A VEHICLE

(71) Applicant: GM Global Technology Operations LLC, Detroit, MI (US)

(72) Inventors: Vijaiya Shankar Ramakrishnan, Bangalore (IN); Muragesh Tubaki, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 111 days.

(21) Appl. No.: 18/193,767

(22) Filed: Mar. 31, 2023

(65) Prior Publication Data

US 2024/0326676 A1    Oct. 3, 2024

(51) Int. Cl.
*B60N 3/10* (2006.01)

(52) U.S. Cl.
CPC ..................... *B60N 3/106* (2013.01)

(58) Field of Classification Search
CPC .................... B60N 3/106; B60N 3/10
USPC ....... 220/737, 533, 534, 535, 536, 537, 538, 220/539
See application file for complete search history.

(56) References Cited

U.S. PATENT DOCUMENTS

| | | | |
|---|---|---|---|
| 1,367,245 A * | 2/1921 | Ebrenz | B42F 17/02 211/184 |
| 1,849,024 A * | 3/1932 | Mckee | A47B 88/969 220/551 |
| 2,850,017 A * | 9/1958 | Anderson | B42F 17/02 220/550 |
| 3,893,585 A * | 7/1975 | Morrison | B60R 7/088 206/387.14 |
| 3,913,777 A * | 10/1975 | Schoenly | B42F 17/02 220/550 |
| 4,838,445 A * | 6/1989 | Lanius | B65D 25/06 220/533 |
| 5,524,958 A | 6/1996 | Wieczorek et al. | |
| 7,708,247 B2 | 5/2010 | Lota | |
| 8,100,282 B2 * | 1/2012 | Nyeboer | B65D 19/06 206/544 |

(Continued)

FOREIGN PATENT DOCUMENTS

| | | | | | |
|---|---|---|---|---|---|
| CN | 112193134 A | * | 1/2021 | | |
| DE | 102008049759 A1 | * | 4/2010 | | B60N 3/106 |

(Continued)

*Primary Examiner* — J. Gregory Pickett
*Assistant Examiner* — Niki M Eloshway
(74) *Attorney, Agent, or Firm* — CANTOR COLBURN LLP

(57) ABSTRACT

A reconfigurable storage bin for a vehicle includes a storage bin portion including a base wall, a plurality of side walls including a first end wall, a second end wall opposite the first end wall, a first lateral side wall, and a second lateral side wall. The base wall and the plurality of side walls defining a storage zone. A rail member has a first end arranged at the first end wall, a second end arranged at the second end wall, and an intermediate portion extending between the first end and the second end. The intermediate portion extending at a non-zero angle relative to the first end wall, the second end wall, the first lateral side wall, and the second lateral side wall. A retaining device is mounted to the rail member. The retaining device is shiftable between the first end and the second end.

20 Claims, 5 Drawing Sheets

(56) References Cited

U.S. PATENT DOCUMENTS

| | | | | |
|---|---|---|---|---|
| 8,556,092 B2 * | 10/2013 | Valiulis | ................... | A47F 5/005 |
| | | | | 211/175 |
| 2008/0048466 A1 | 2/2008 | Singh et al. | | |
| 2014/0124638 A1 * | 5/2014 | Takai | ..................... | B60N 3/106 |
| | | | | 248/311.2 |
| 2016/0101718 A1 * | 4/2016 | Bohlke | .................. | B60N 3/106 |
| | | | | 296/37.8 |
| 2023/0373402 A1 * | 11/2023 | Bernal | ...................... | B60R 9/06 |

FOREIGN PATENT DOCUMENTS

| | | | | | |
|---|---|---|---|---|---|
| DE | 102011100835 B3 | * | 3/2012 | ............ | B60N 3/106 |
| DE | 102011085384 A1 | * | 5/2013 | ............ | B60N 3/102 |
| DE | 102016125723 A1 | * | 6/2018 | ............ | B60N 3/106 |
| FR | 2991930 A1 | * | 12/2013 | ............ | B60N 3/105 |
| WO | WO-2020182382 A1 | * | 9/2020 | ............ | B60N 3/106 |

* cited by examiner

RECONFIGURABLE STORAGE BIN FOR A VEHICLE

INTRODUCTION

The subject disclosure relates to the art of vehicle storage bins and, more particularly, to a reconfigurable storage bin for a vehicle.

Vehicles include a wide variety of compartments, nooks, holders and the like that are used by drivers and passengers for a variety of purposes. Compartments may be covered, such as glove boxes, change holders, sunglass holders and the like or they may be open such as cup holders. Cup holders may include various gripping structures for holding a standard coffee cup. In addition to being a place to rest a cup, cup holders may also be used to store other articles including change, keys, toys, and the like. Given the size and shape of a cup holder, the type of articles that may be stored is limited. Further, retrieving the articles from a cup holder can pose a challenge for certain users.

Cup holders are generally sized to accept and retain standard beverage containers up to about 20 oz. (600 ml). Currently, many people have started using new, larger containers that are often times made of metal or other thermal retaining material. The larger containers are typically taller and/or possess a greater diameter than standard 20 oz. (600 ml) beverage containers. Given the difference in dimensions, the larger containers do not typically fit into standard cup holder compartments and/or are not stable when inserted into a standard cup holder compartment. Accordingly, it is desirable to provide a compartment that not only allows for the easy retrieval of various articles but can also accommodate a wider range of beverage containers.

SUMMARY

A reconfigurable storage bin for a vehicle, in accordance with a non-limiting example, includes a storage bin portion including a base wall, a plurality of side walls including a first end wall, a second end wall opposite the first end wall, a first lateral side wall, and a second lateral side wall opposite the first lateral side wall. The base wall and the plurality of side walls defining a storage zone. A rail member has a first end arranged at the first end wall, a second end arranged at the second end wall, and an intermediate portion extending between the first end and the second end. The intermediate portion extending at a non-zero angle relative to the first end wall, the second end wall, the first lateral side wall, and the second lateral side wall. A retaining device is mounted to the rail member. The retaining device is shiftable between the first end and the second end.

In addition to one or more of the features described herein the intermediate portion of the rail member includes a first surface and a second surface opposite the first surface, the second surface including a plurality of tooth elements extending between the first end and the second end.

In addition to one or more of the features described herein the retaining device includes a latch mechanism including a plurality of tooth members that selectively engage with the plurality of tooth elements to lock the retaining device relative to the rail member.

In addition to one or more of the features described herein the retaining device includes an actuator that selectively disengages the plurality of tooth members from the plurality of tooth elements allowing the retaining device to shift between the first end and the second end of the rail member.

In addition to one or more of the features described herein the rail member includes a hinge arranged in the intermediate portion.

In addition to one or more of the features described herein the rail member includes a first support arranged at the first end and a second support arranged at the second end.

In addition to one or more of the features described herein the first support includes a connector element, the connector element selectively connecting the first support to the storage bin portion at the first end wall.

In addition to one or more of the features described herein a first guide rail extends along the first lateral side wall between the first end wall and the second end wall and a second guide rail extending along the second lateral side wall between the first end wall and the second end wall, the first support being selectively shiftable along the first guide rail and the second guide rail.

In addition to one or more of the features described herein the second support includes another connector element, the another connector element selectively connecting the second support to the storage bin portion at the second end wall.

In addition to one or more of the features described herein the retaining device defines a cup holder reconfigurable to retain cups having different diameters.

A vehicle, in accordance with a non-limiting example, includes a body defining, in part, a passenger compartment and a reconfigurable storage bin arranged in the passenger compartment. The reconfigurable storage bin includes a storage bin portion including a base wall, a plurality of side walls including a first end wall, a second end wall opposite the first end wall, a first lateral side wall, and a second lateral side wall opposite the first lateral side wall. The base wall and the plurality of side walls define a storage zone. A rail member has a first end arranged at the first end wall, a second end arranged at the second end wall, and an intermediate portion extending between the first end and the second end. The intermediate portion extending at a non-zero angle relative to the first end wall, the second end wall, the first lateral side wall, and the second lateral side wall. A retaining device is mounted to the rail member. The retaining device is shiftable between the first end and the second end.

In addition to one or more of the features described herein the intermediate portion of the rail member includes a first surface and a second surface opposite the first surface, the second surface including a plurality of tooth elements extending between the first end and the second end.

In addition to one or more of the features described herein the retaining device includes a latch mechanism including a plurality of tooth members that selectively engage with the plurality of tooth elements to lock the retaining device relative to the rail member.

In addition to one or more of the features described herein the retaining device includes an actuator that selectively disengages the plurality of tooth members from the plurality of tooth elements allowing the retaining device to shift between the first end and the second end of the rail member.

In addition to one or more of the features described herein the rail member includes a hinge arranged in the intermediate portion.

In addition to one or more of the features described herein the rail member includes a first support arranged at the first end and a second support arranged at the second end.

In addition to one or more of the features described herein the first support includes a connector element, the connector element selectively connecting the first support to the storage bin portion at the first end wall.

In addition to one or more of the features described herein a first guide rail extends along the first lateral side wall between the first end wall and the second end wall and a second guide rail extending along the second lateral side wall between the first end wall and the second end wall, the first support being selectively shiftable along the first guide rail and the second guide rail.

In addition to one or more of the features described herein the second support includes another connector element, the another connector element selectively connecting the second support to the storage bin portion at the second end wall.

In addition to one or more of the features described herein the retaining device defines a cup holder reconfigurable to retain cups having different diameters.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
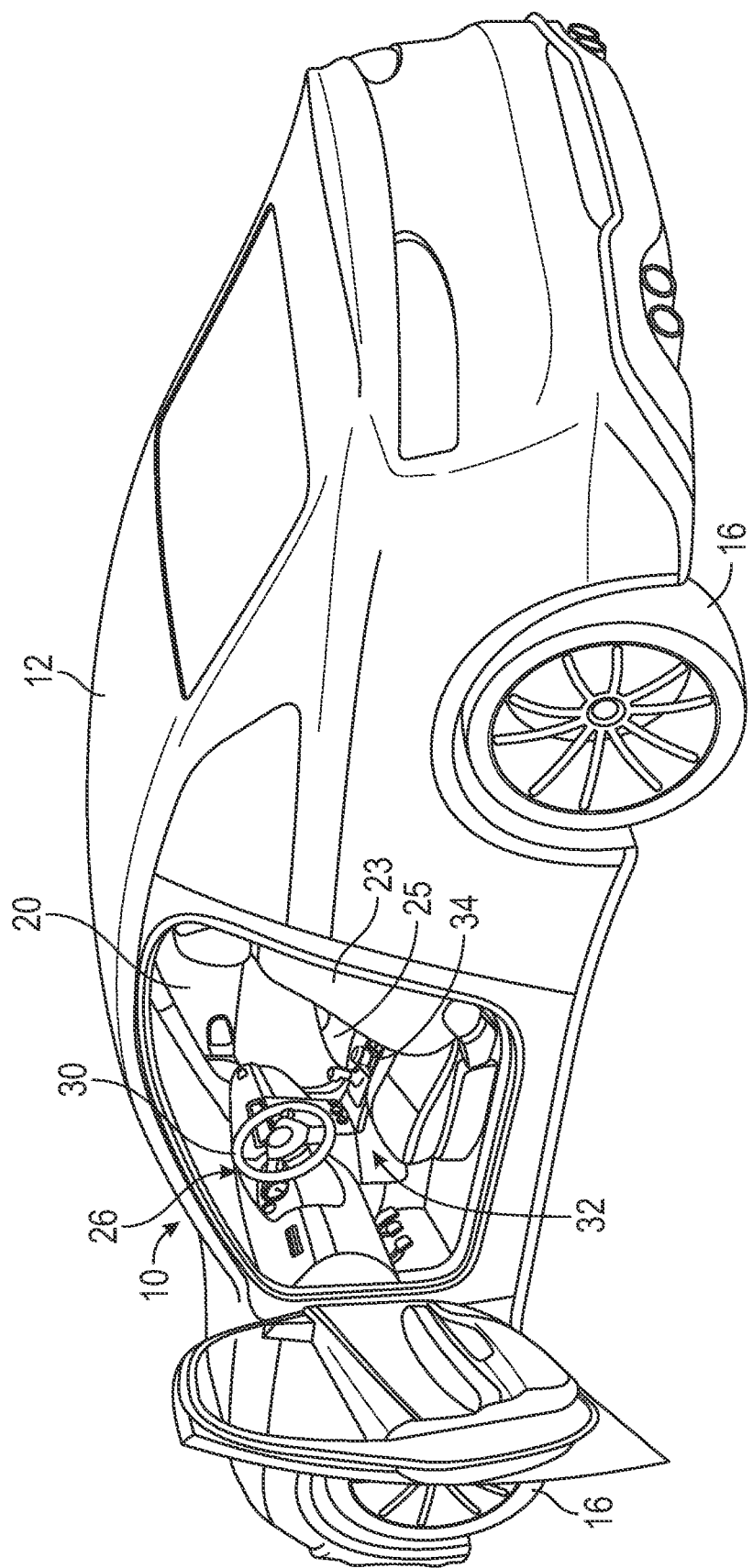
FIG. 1 is a left side perspective view of a vehicle including a reconfigurable storage bin, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having seats, including a driver's seat 23 and a front passenger seat 25. Driver's seats 23 and front passenger seat 25 are positioned behind a dashboard 26. A steering control system 30 is arranged between driver's seat 23 and dashboard 26. In a non-limiting example, a center console 32 is arranged between driver's seat 23 and front passenger seat 25. Center console 32 supports a reconfigurable storage bin 34 as will be detailed herein.

Figure 2:
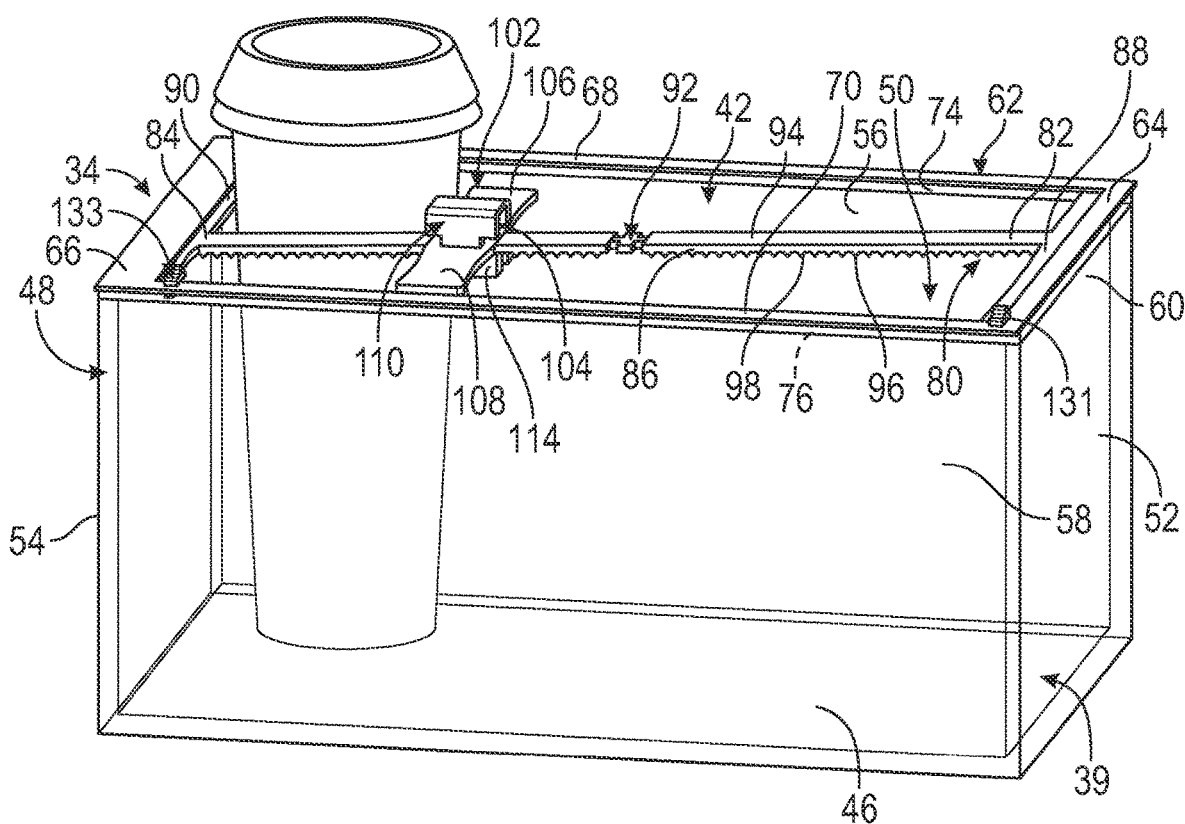
FIG. 2 is a left side perspective glass view of the reconfigurable storage bin, in accordance with a non-limiting example.
Figure 3:
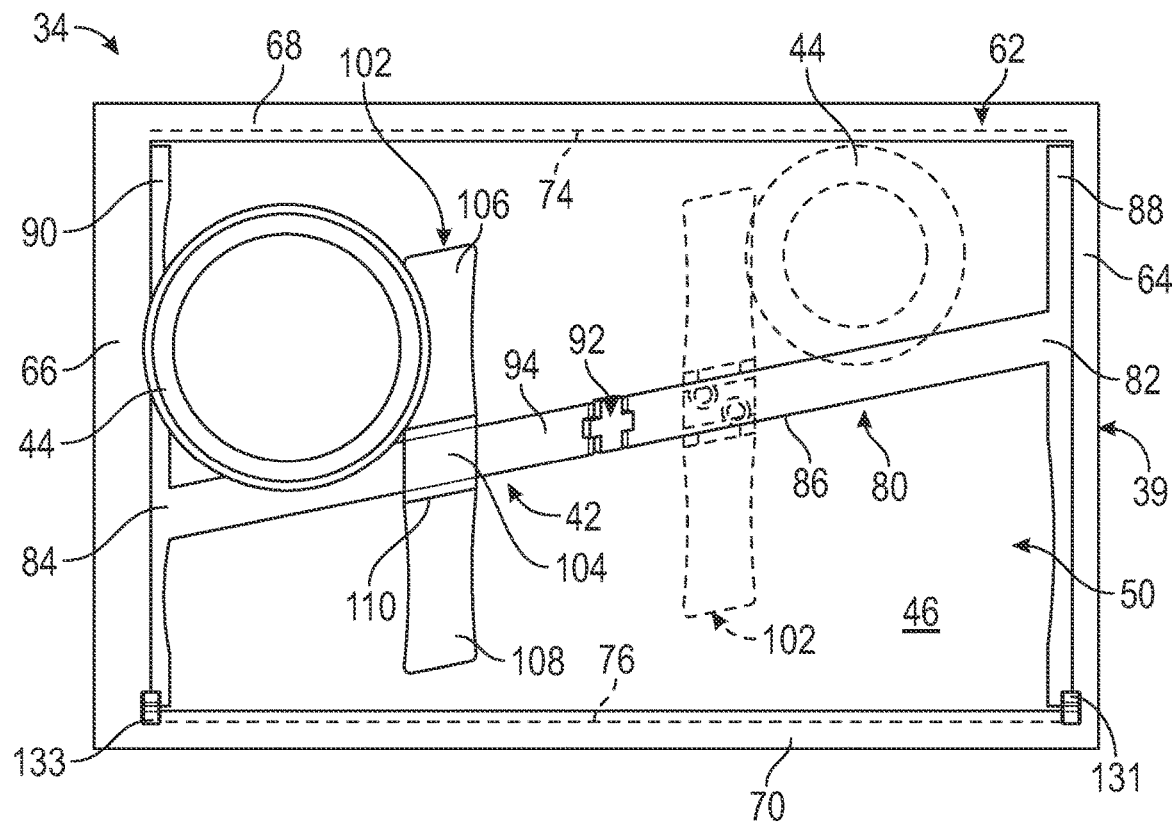
FIG. 3 is a top view of the reconfigurable storage bin showing a retaining device in a forward position and an optional rearward position, in accordance with a non-limiting example.

Reference will now follow to FIGS. 2 and 3 in describing reconfigurable storage bin 34 in accordance with a non-limiting example. Reconfigurable storage bin 34 includes a storage bin portion 39 and an article holder portion 42. As will be detailed more fully herein, article holder portion 42 may be selectively reconfigured to accommodate a wide range of articles of various sizes. In a non-limiting example, article holder portion 42 is designed to retain cups, such as indicated at 44, in an upright orientation in storage bin portion 39. Article holder portion 42 may be adjusted to accommodate and retain cups 44 having different diameters and may also be removed in order to accommodate other articles.

In a non-limiting example, storage bin portion 39 includes a base wall 46 and a plurality of side walls 48 that define a storage zone 50. Plurality of side walls 48 include a first end wall 52, a second end wall 54 opposite to first end wall 52, a first lateral side wall 56, and a second lateral side wall 58 opposite to first lateral side wall 56. First lateral side wall 56 and second lateral side wall 58 extend between and connect with first end wall 52 and second end wall 54. Storage bin portion 39 includes an upper edge 60 that supports a frame 62. Frame 62 includes a first end portion 64, a second end portion 66, a first side portion 68 and a second side portion 70.

First side portion 68 and second side portion 70 extend between and connect with first end portion 64 and second end portion 66. In a non-limiting example, first side portion 68 includes a first recess (not separately labeled) that extends between first end portion 64 and second end portion 66. The recess forms a first guide rail 74. In a non-limiting example, second side portion 70 includes a second recess (not separately labeled) that extends between first end portion 64 and second end portion 66. The second recess forms a second guide rail 76.

In a non-limiting example, article holder portion 42 includes a rail member 80 having a first end 82 supported at first end wall 52, a second end 84 supported at second end wall 54, and an intermediate portion 86. A first support 88 is arranged at first end 82 and a second support 90 is arranged at second end 84. First support extends into first guide rail 74 and second guide rail 76. Likewise, second support 90 extends into first guide rail 74 and second guide rail 76. As will be detailed herein, first and/or second supports 88 or 90 may slide between first end wall 52 and second end wall 54 on first guide rail 74 and second guide rail 76. Intermediate portion 86 extends between first end 82 and second end 84. Intermediate portion 86 supports a hinge 92 and includes a first surface 94 and a second surface 96 that is opposite first surface 94. Second surface 96 defines a lower surface (not separately labeled) and includes a plurality of tooth elements 98.

In a non-limiting example, rail member 80 extends across storage zone 50 at a non-zero angle. That is, first end 82 is closer to first lateral side wall 56 than to second lateral side wall 58. Second end 84 is closer to second lateral side wall 58 than to first lateral side wall 56. Thus, rail member 80 is not perpendicular to first end wall 52 or second end wall 54 and does not extend parallel to either first lateral side all 56 or second lateral side wall 58. In this manner, various sized articles may be accommodated as will be detailed more fully herein.

Figure 5:
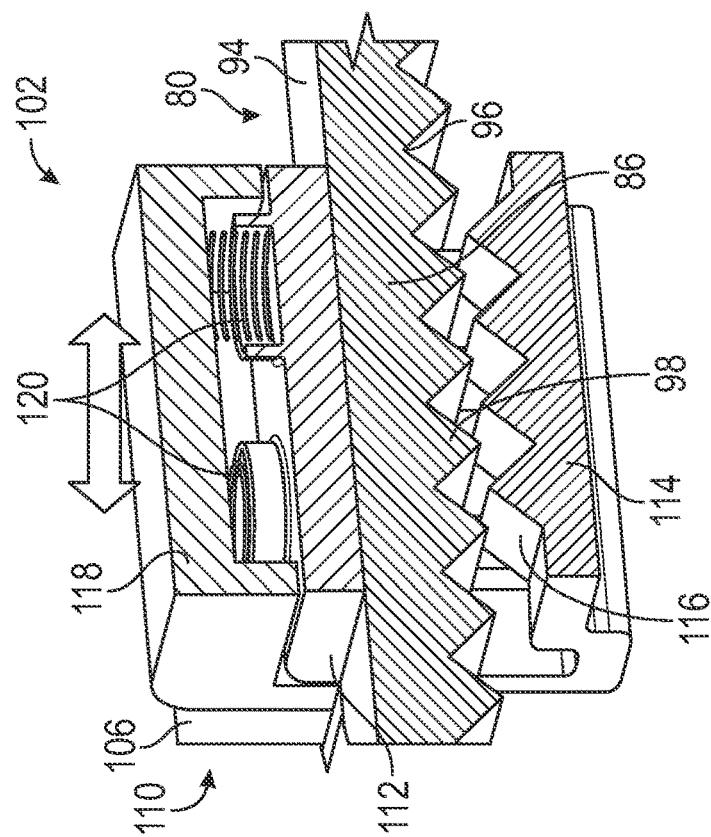
FIG. 5 is a perspective sectional view of a latch mechanism associated with the retaining device in a disengaged configuration, in accordance with a non-limiting example.
Figure 4:
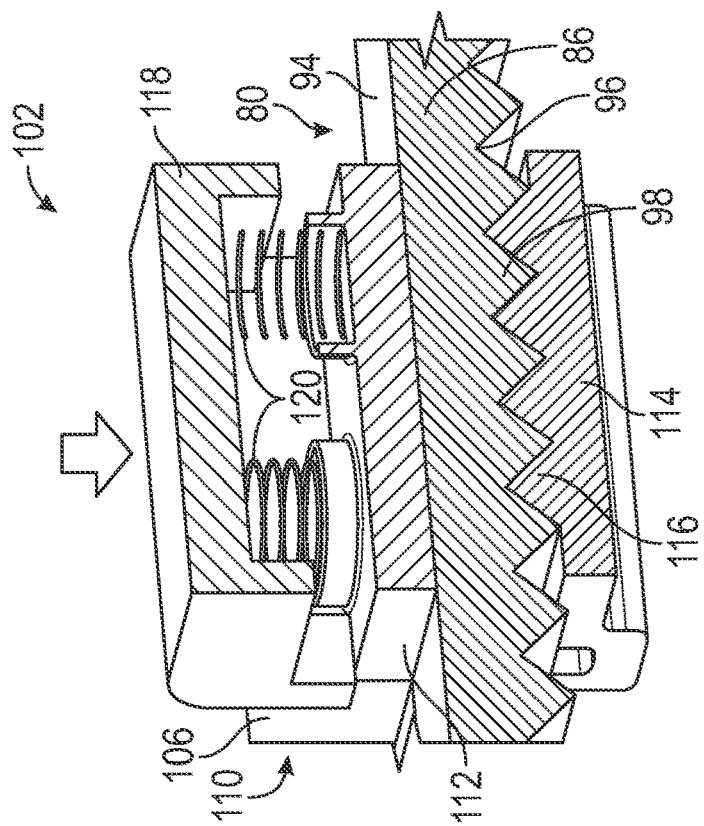
FIG. 4 is a perspective sectional view of a latch mechanism associated with the retaining device in an engaged configuration, in accordance with a non-limiting example.

In a non-limiting example, article holder portion 42 includes a retaining device 102 slideably mounted to rail member 80. Retaining device 102 includes a center portion 104 coupled to rail member 40, a first retainer 106 extending from center portion 104 in a first direction and a second retainer 108 extending from center portion 104 in a second direction that is opposite the first direction. As shown in FIGS. 4 and 5, retaining device 102 includes a latch mechanism 110 having a glide member 112 that runs along first surface 94 of rail member 80 and a latch member 114 including a plurality of tooth members 116 that selectively engage with the plurality of tooth elements 98 to fix retaining device 102 to rail member 80. Latch mechanism 110 further includes an actuator 118 that selectively disengages latch member 114 from second surface 96. When released, springs 120 cause latch member 114 to re-engage.

In a non-limiting example, when actuator 118 is depressed and latch member 114 is released from second surface 96, retaining device 102 may slide freely between first end 82 and second end 84 of rail member 80. In this manner, retaining device 102 may be adjusted to accommodate articles, such as cups, having different diameters such as shown in FIG. 3. In one position, larger diameter cups may be accommodated on one side of rail member 80 and when in a second position, smaller diameter cups may be accommodated on the same side. Retaining member 102 may be positioned to accommodate any diameter cup that will fit between rail member 80 and first or second lateral side walls 56 or 58.

Figure 6:
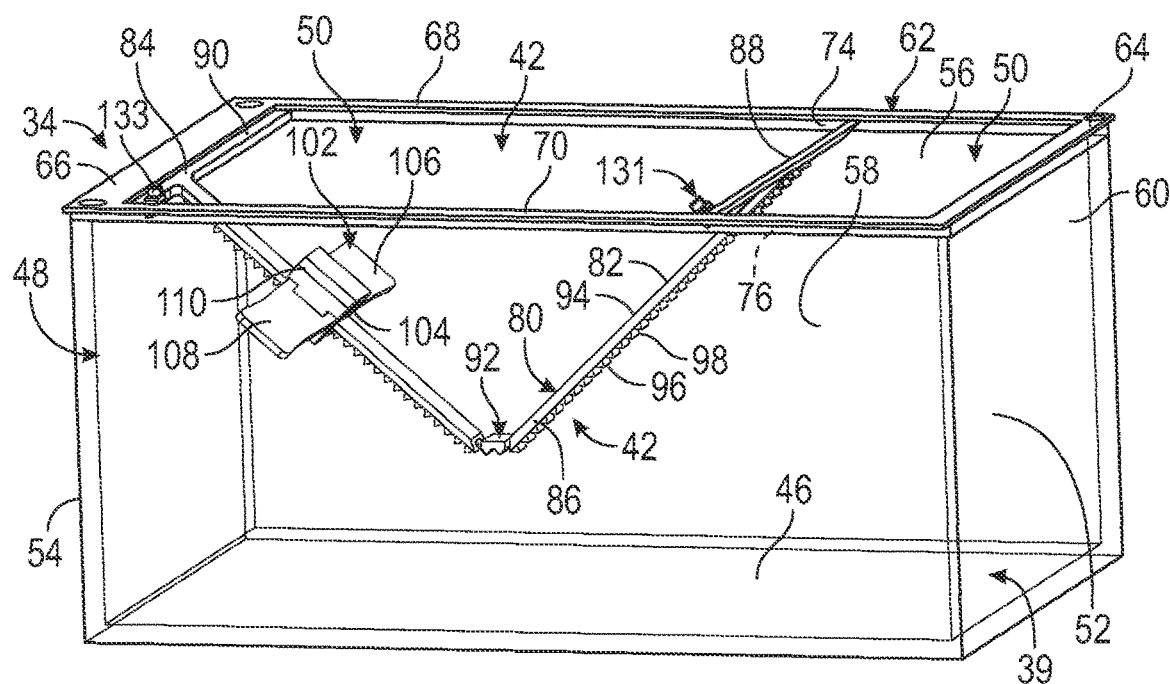
FIG. 6 is a perspective glass view of a rail member of the reconfigurable storage bin folding to a stowed configuration, in accordance with a non-limiting example.
Figure 7:
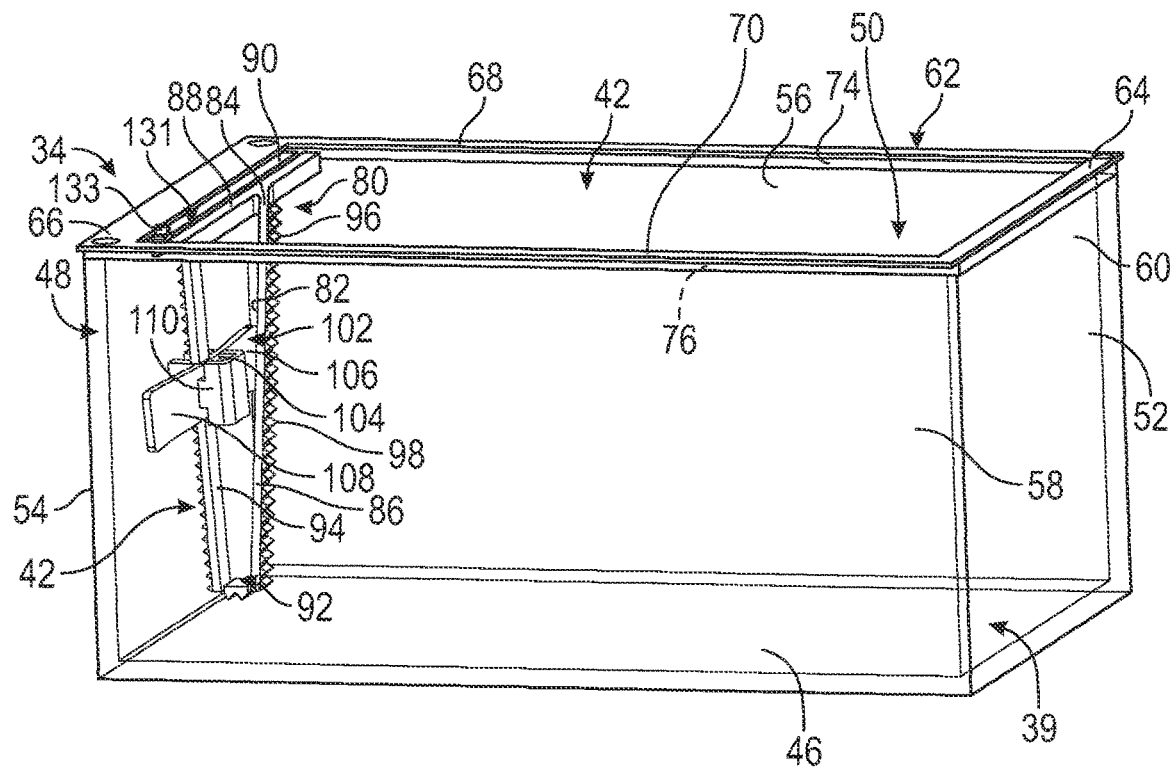
FIG. 7 is a perspective glass view of a rail member of the reconfigurable storage bin in the stowed configuration, in accordance with a non-limiting example.

In a non-limiting example, when not in use, article holder portion 42 may be folded into a stowed position as shown in FIGS. 6 and 7. First support 88 may be released from frame 62 and guided along first and second guide rails 74 and 76 while at the same time hinge 92 folds (FIG. 6). First support 88 may be moved towards and/or against second support 90 as shown in FIG. 7 such that storage zone 50 is fully available. In a non-limiting example, second support 90 may also be released from frame 62 allowing article holding portion 42 to be completely disengaged and removed from storage bin portion 39.

Figure 8:
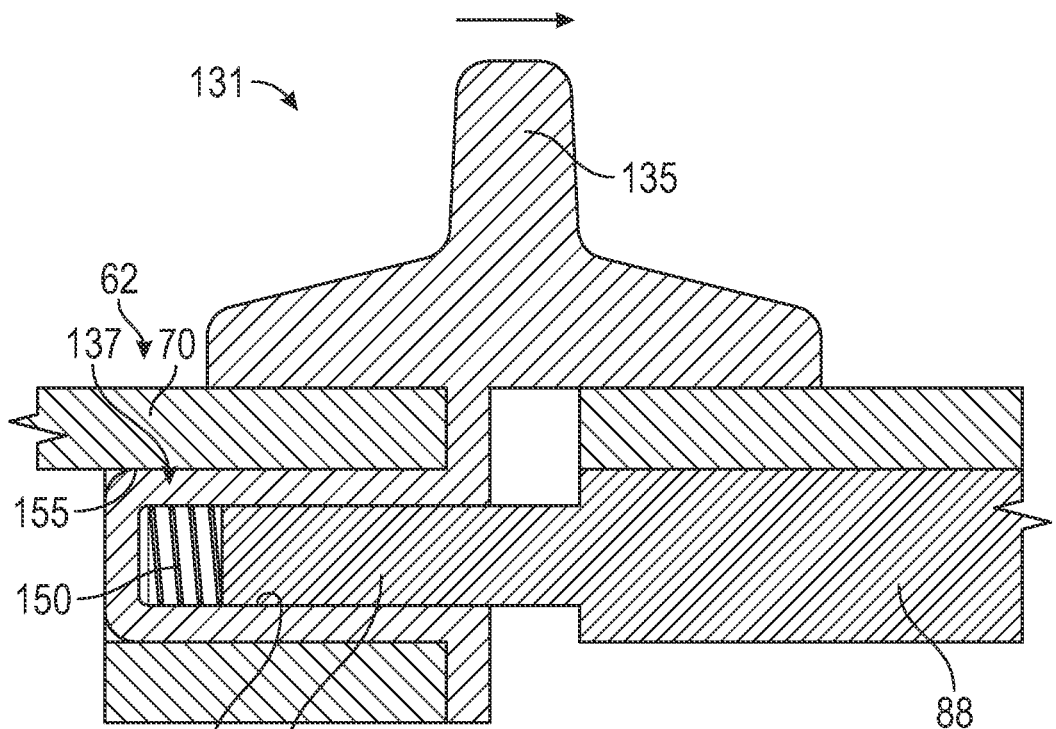
FIG. 8 is a cross-sectional side view of a connector element associated with a first support for the rail member in a connected configuration, in accordance with a non-limiting example.
Figure 9:
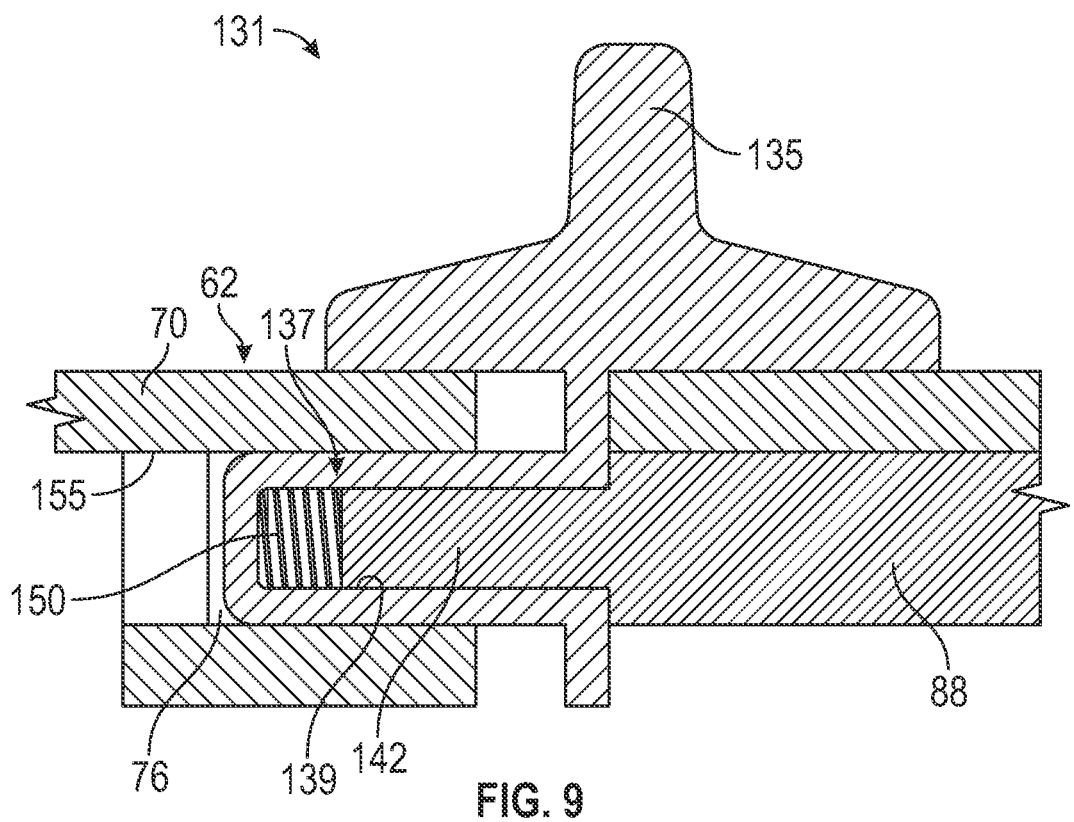
FIG. 9 is a cross-sectional side view of a connector element associated with a first support for the rail member in a disconnected configuration allowing the rail member to fold toward the stowed configuration, in accordance with a non-limiting example.

In a non-limiting example, first support 88 includes a first connector element 131 (FIG. 6) and second support 90 includes a second connector element 133. Reference will now follow to FIGS. 8 and 9 in describing first connector element 131 with an understanding that second connector element 133 includes similar structure. First connector element 131 includes an actuator member 135 connected to a lock pin 137. Lock pin 137 include a hollow interior 139 that receives a pin member 142 that extends from first support 88. Pin member 142 defines a reduced thickness portion of first support 88 and may include a diameter. A spring 150 is arranged between lock pin 137 and pin member 142. Lock pin 137 extends through an opening 155 formed in second side portion 70 of frame 62 adjacent to first end portion 64.

In operation, actuator member 135 may be slide toward rail member 80 causing lock pin 137 to pass from opening 155 and compress spring 150. At this point, first support 88 may be moved along first guide rail 74 and second guide rail 76 as shown in FIG. 6. Rail member 80 may fold as shown in FIG. 7 and article holder portion 42 placed in the stowed configuration. When needed, first support 88 may be urged toward first end portion 64 of frame 62. When in position, spring 150 will bias lock pin 137 into opening 155. Once in place, retaining device 102 may be adjusted as necessary. At this point, while shown as being arranged in center console, storage bin could be in other locations in passenger compartment 20. Also, while shown as retaining cups 44, article holder portion 42 may be used to retain a wide variety of articles in storage zone 50.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A reconfigurable storage bin for a vehicle comprising:
 a storage bin portion including a base wall, a plurality of side walls including a first end wall, a second end wall opposite the first end wall, a first lateral side wall, and a second lateral side wall opposite the first lateral side wall, the base wall and the plurality of side walls defining a storage zone;
 a rail member defining a first surface and a second surface opposite the first surface and spaced apart from the base wall, the rail member having a first end arranged at the first end wall, a second end arranged at the second end wall, and an intermediate portion extending between the first end and the second end, the intermediate portion extending at a non-zero angle relative to the first end wall, the second end wall, the first lateral side wall, and the second lateral side wall;
 a plurality of tooth elements, each of the tooth elements extending towards the base wall from the second surface the rail member; and
 a retaining device mounted to the rail member, the retaining device being slidable on the rail member between the first end and the second end and engaging with the first and second surfaces of the rail member.

2. The reconfigurable storage bin according to claim 1, wherein the plurality of tooth elements are disposed at the intermediate portion of the rail member.

3. The reconfigurable storage bin according to claim 2, wherein the retaining device includes a latch mechanism including a plurality of tooth members that selectively engage with the plurality of tooth elements to lock the retaining device relative to the rail member.

4. The reconfigurable storage bin according to claim 3, wherein the retaining device includes an actuator that selectively disengages the plurality of tooth members from the plurality of tooth elements allowing the retaining device to shift between the first end and the second end of the rail member.

5. The reconfigurable storage bin according to claim 1, wherein the rail member includes a hinge arranged in the intermediate portion.

6. The reconfigurable storage bin according to claim 5, wherein the rail member includes a first support arranged at the first end and a second support arranged at the second end.

7. The reconfigurable storage bin according to claim 6, wherein the first support includes a connector element, the connector element selectively connecting the first support to the storage bin portion at the first end wall.

8. The reconfigurable storage bin according to claim 7, further comprising a first guide rail extending along the first lateral side wall between the first end wall and the second end wall and a second guide rail extending along the second lateral side wall between the first end wall and the second end wall, the first support being selectively shiftable along the first guide rail and the second guide rail.

9. The reconfigurable storage bin according to claim 8, wherein the second support includes another connector element, the another connector element selectively connecting the second support to the storage bin portion at the second end wall.

10. The reconfigurable storage bin according to claim 1, wherein the retaining device defines a cup holder reconfigurable to retain cups having different diameters.

11. A vehicle comprising:
a body defining, in part, a passenger compartment; and
a reconfigurable storage bin arranged in the passenger compartment, the reconfigurable storage bin comprising:
a storage bin portion including a base wall, a plurality of side walls including a first end wall, a second end wall opposite the first end wall, a first lateral side wall, and a second lateral side wall opposite the first side wall, the base wall and the plurality of side walls defining a storage zone;
a rail member defining a first surface and a second surface opposite the first surface and spaced apart from the base wall, the rail member having a first end arranged at the first end wall, a second end arranged at the second end wall, and an intermediate portion extending between the first end and the second end, the intermediate portion extending at a non-zero angle relative to the first end wall, the second end wall, the first lateral side wall, and the second lateral side wall;
a plurality of tooth elements, each of the tooth elements extending towards the base wall from the second surface the rail member; and
a retaining device mounted to the rail member, the retaining device being slidable on the rail member between the first end and the second end and engaging with the first and second surfaces of the rail member.

12. The vehicle according to claim 11, wherein the plurality of tooth elements are disposed at the intermediate portion of the rail member.

13. The vehicle according to claim 12, wherein the retaining device includes a latch mechanism including a plurality of tooth members that selectively engage with the plurality of tooth elements to lock the retaining device relative to the rail member.

14. The vehicle according to claim 13, wherein the retaining device includes an actuator that selectively disengages the plurality of tooth members from the plurality of tooth elements allowing the retaining device to shift between the first end and the second end of the rail member.

15. The vehicle according to claim 11, wherein the rail member includes a hinge arranged in the intermediate portion.

16. The vehicle according to claim 15, wherein the rail member includes a first support arranged at the first end and a second support arranged at the second end.

17. The vehicle according to claim 16, wherein the first support includes a connector element, the connector element selectively connecting the first support to the storage bin portion at the first end wall.

18. The vehicle according to claim 17, further comprising a first guide rail extending along the first lateral side wall between the first end wall and the second end wall and a second guide rail extending along the second lateral side wall between the first end wall and the second end wall, the first support being selectively shiftable along the first guide rail and the second guide rail.

19. The vehicle according to claim 18, wherein the second support includes another connector element, the another connector element selectively connecting the second support to the storage bin portion at the second end wall.

20. The vehicle according to claim 11, wherein the retaining device defines a cup holder reconfigurable to retain cups having different diameters.

* * * * *